United States Patent
Wang et al.

(10) Patent No.: US 12,082,253 B2
(45) Date of Patent: Sep. 3, 2024

(54) METHOD AND DEVICE OPERATING IN UNLICENSED SPECTRUM

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 137 days.

(21) Appl. No.: 17/414,005

(22) PCT Filed: Sep. 26, 2019

(86) PCT No.: PCT/CN2019/108260
§ 371 (c)(1),
(2) Date: Jun. 15, 2021

(87) PCT Pub. No.: WO2020/125121
PCT Pub. Date: Jun. 25, 2020

(65) Prior Publication Data
US 2022/0346147 A1    Oct. 27, 2022

(30) Foreign Application Priority Data
Dec. 21, 2018   (WO) ................ PCT/CN2018/122849

(51) Int. Cl.
*H04W 74/08*  (2024.01)
*H04W 74/0816* (2024.01)

(52) U.S. Cl.
CPC ... *H04W 74/0816* (2013.01); *H04W 74/0866* (2013.01)

(58) Field of Classification Search
CPC ......... H04W 74/0808; H04W 74/0816; H04W 74/0866; H04W 16/14; H04W 24/10;
(Continued)

(56) References Cited

U.S. PATENT DOCUMENTS 11,051,325 B2 *  6/2021  Wang ................ H04W 72/1268
11,277,864 B2 *  3/2022  Yang ................ H04W 74/0808
(Continued)

FOREIGN PATENT DOCUMENTS

CN   106559795 A   4/2017
CN   106664690 A   5/2017
(Continued)

OTHER PUBLICATIONS

Qualcomm Incorporated, "Channel access procedures for NR unlicensed", 3GPP TSG RAN WG1 Meeting #93, R1-1807389, Busan, Korea, May 21-May 25, 2018, 1-9.
(Continued)

*Primary Examiner* — Liton Miah
(74) *Attorney, Agent, or Firm* — Murphy, Bilak & Homiller, PLLC

(57) ABSTRACT

The present disclosure provides a method implemented in a wireless network node operating in an unlicensed spectrum, comprising determining a Listen-before-Talk LBT mode for a terminal device; and sending a first indication indicating the determined LBT mode to the terminal device. The disclosure also provides a method implemented in a terminal device operating in an unlicensed spectrum.

23 Claims, 8 Drawing Sheets

(58) Field of Classification Search
CPC ............ H04W 74/002; H04W 74/006; H04W 74/008; Y02D 30/70
See application file for complete search history.

(56) References Cited

U.S. PATENT DOCUMENTS

| | | | |
|---|---|---|---|
| 2015/0373582 | A1 | 12/2015 | Valliappan et al. |
| 2017/0318607 | A1 | 11/2017 | Tiirola et al. |
| 2017/0359808 | A1* | 12/2017 | Dinan .................... H04L 5/0053 |
| 2018/0020375 | A1 | 1/2018 | Matsumoto et al. |
| 2018/0049241 | A1* | 2/2018 | Heo ................... H04W 74/0808 |
| 2018/0270860 | A1* | 9/2018 | Bhorkar .............. H04W 74/006 |
| 2018/0288805 | A1* | 10/2018 | Bhorkar ............ H04W 74/0816 |
| 2018/0343676 | A1* | 11/2018 | Yerramalli ........ H04W 74/0808 |
| 2019/0053222 | A1* | 2/2019 | Bhorkar ................ H04W 16/14 |
| 2019/0116005 | A1 | 4/2019 | Harada et al. |
| 2019/0150170 | A1* | 5/2019 | Park ...................... H04W 74/08 370/329 |
| 2019/0342915 | A1* | 11/2019 | Kim ...................... H04W 72/20 |
| 2021/0298045 | A1* | 9/2021 | Kim .................. H04W 72/0453 |

FOREIGN PATENT DOCUMENTS

| | | |
|---|---|---|
| CN | 107371273 A | 11/2017 |
| JP | 2017184203 A | 10/2017 |
| JP | 2018534888 A | 11/2018 |
| KR | 20170020810 A | 2/2017 |
| WO | 2016148244 A1 | 9/2016 |
| WO | 2017116132 A1 | 7/2017 |
| WO | 2018059512 A1 | 4/2018 |

OTHER PUBLICATIONS

Qualcomm Incorporated, "TxOP Frame Structure for NR unlicensed", 3GPP TSG RAN WG1 Meeting #93, R1-1807386, Busan, Korea, May 20-May 25, 2018, 1-8.

Huawei, et al., "Considerations on UL Qos mapping for LAA SCell", 3GPP TSG-RAN WG2 Meeting #95, R2-165503, Gothenburg, Sweden, Aug. 22-26, 2016, 1-2.

* cited by examiner determining a Listen-before-Talk, LBT, mode for a terminal device — 201

Sending a first indication indicating the determined LBT mode to the terminal device — 202

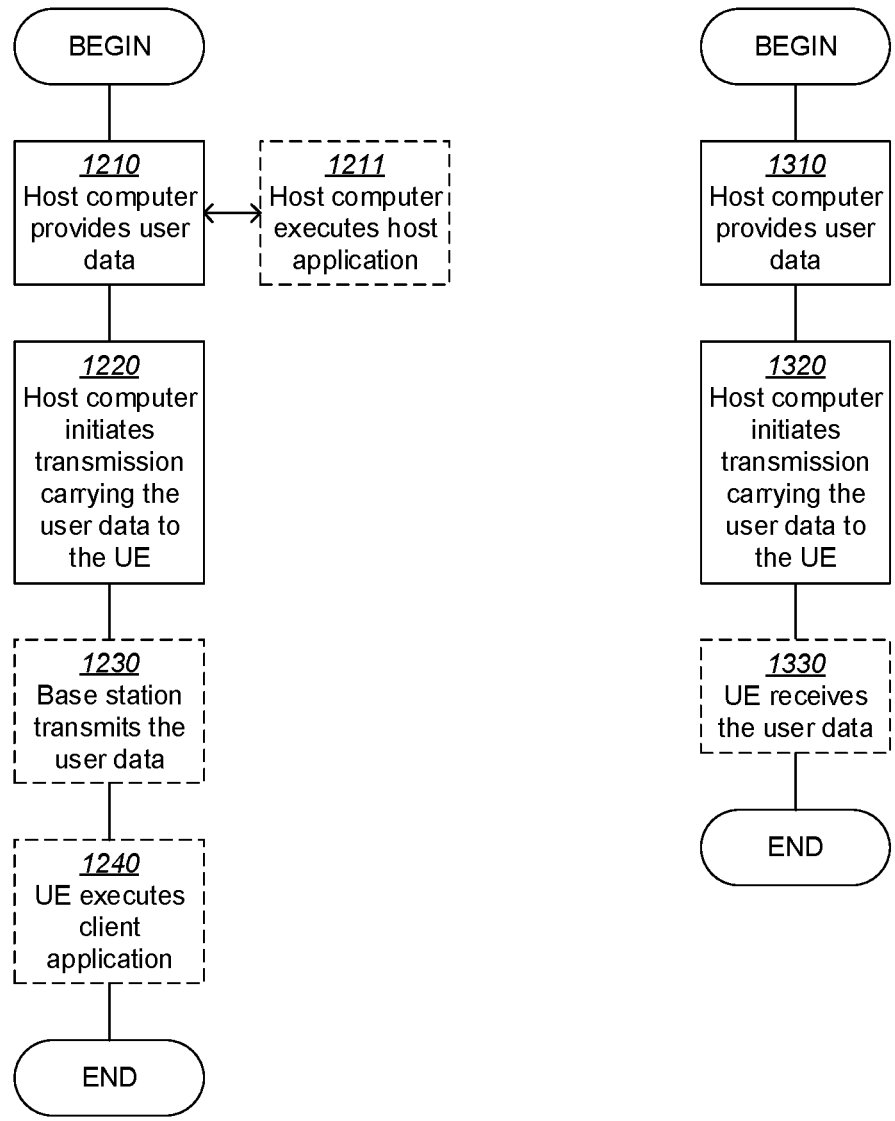

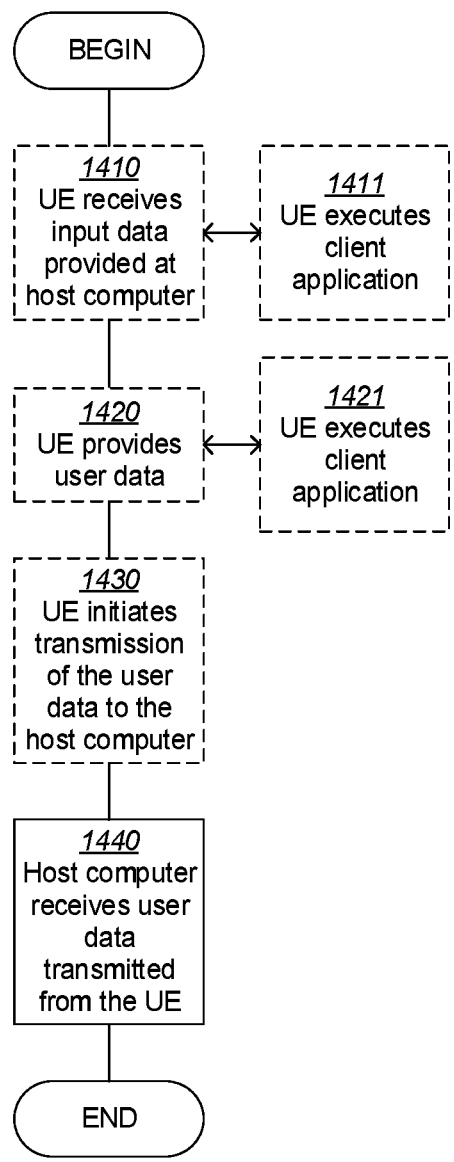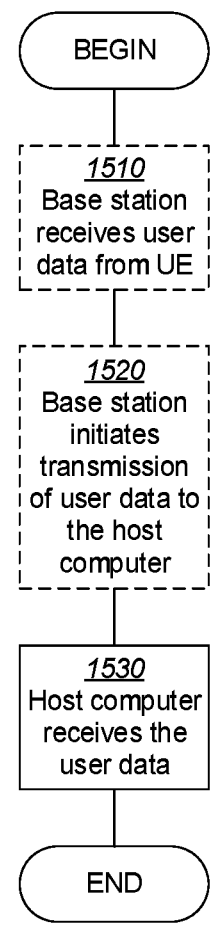
Fig.14
Fig.15

METHOD AND DEVICE OPERATING IN UNLICENSED SPECTRUM

FIELD OF THE INVENTION

The present disclosure generally relates to wireless communication networks, and more specifically, to a method and a device operating in unlicensed spectrum.

BACKGROUND

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with varying length of waiting period in between (here called inactive state). In New Radio (NR), both license assisted access and standalone unlicensed operation are to be supported in the $3^{rd}$ Generation Partnership Project (3GPP). Hence the procedure of Physical Random Access Channel (PRACH) transmission and/or Scheduling Request (SR) transmission in unlicensed spectrum shall be investigated in 3GPP. In the following, channel sensing scheme based on Listen before Talk (LBT), random access procedure and LBT scheme for PRACH and short Physical Uplink Control Channel (sPUCCH) are introduced as a basis to address the solutions.

Radio Resource Management (RRM) measurements in NR unlicensed spectrum are as follows.

In order to tackle with the ever increasing data demanding, NR is considered both licensed and unlicensed spectrum. The standardization work for licensed spectrum in Rel-15 is still on-going and will be finished in 2018. Therefore, 3GPP has defined a study item on NR-based Access to Unlicensed Spectrum was approved At Radio Access Network 77 (RAN-77). At this study item, compared to the Long Term Evolution License Assisted Access (LTE LAA), NR-Unlicensed (NR-U) also need to support Dual Connectivity (DC) and standalone scenarios, where the Media Access Control (MAC) procedures including Random Access Channel (RACH) and scheduling procedure on unlicensed spectrum are subject to the LBT failures, while there was no such restriction in LTE LAA, since there was licensed spectrum in LAA scenario so the RACH and scheduling related signaling can be transmitted on the licensed spectrum instead of unlicensed spectrum.

The RRM procedures in NR-U would be generally rather similar as in LAA, since NR-U is aiming to reuse LAA/eLAA/feLAA technologies as much as possible to handle the coexistence between NR-U and other legacy Radio Access Technologies (RATs). Channel access/selection for LAA was one of important aspects for co-existence with other RATs such as Wireless Fidelity (WiFi). For instance, LAA has aimed to use carriers that are congested with WiFi. Therefore, RRM measurements as one critical aspect has been designed are critical for the congestion avoidance purpose.

In licensed spectrum, User Equipment (UE) measures Reference Signal Received Power (RSRP), and Reference Signal Received Quality (RSRQ) of the downlink radio channel, and provides the measurement reports to its serving eNB/gNB. However, they don't reflect the interference strength on the carrier. Another metric Received Signal Strength Indicator (RSSI) can serve for such purpose. At the eNB/gNB side, it is possible to derive RSSI based on the received RSRP and RSRQ reports, however, this requires that they must be available. Due to the LBT failure, some reports in terms of RSRP or RSRP may be blocked (can be either due to that the reference signal transmission (DRS) is blocked in the downlink or the measurement report is blocked in the uplink). Hence, the measurements in terms of RSSI are very useful. The RSSI measurements together with the time information concerning when and how long time that UEs have made the measurements can assist the gNB/eNB to detect the hidden node. Additionally, the gNB/eNB can measure the load situation of the carrier which is useful for the network to prioritize some channels for load balance and channel access failure avoidance purposes.

LTE LAA has defined to support measurements of averaged RSSI and channel occupancy) for measurement reports. The channel occupancy is defined as percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

Channel access procedure in NR unlicensed spectrum is generally performed as follows.

Listen-before-talk (LBT) is designed for unlicensed spectrum co-existence with other RATs. In this mechanism, a radio device applies a clear channel assessment (CCA) check before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the Acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For Quality of Service (QoS) differentiation, a channel access priority based on the service type has been defined. For example, there are four LBT priority classes are defined for differentiation of contention window sizes (CWS) and MCOT between services.

The channel access schemes for NR-based access for unlicensed spectrum can be classified into four categories.

For different transmissions in a channel occupancy time (COT) and different channels/signals to be transmitted, different categories of channel access schemes can be used.

As described in 3GPP, if absence of WiFi cannot be guaranteed (e.g. by regulation) in the band (sub-7 GHz) where NR-U is operating, the baseline assumption is, the NR-U operating bandwidth is an integer multiple of 20 MHz.

Channel access mechanisms need to comply with regulations and may therefore need to be adapted for particular frequency ranges.

For channel access mechanism, LTE-LAA LBT mechanism is adopted as baseline for 5 GHz band and adopted as the starting point of the design for 6 GHz band. At least for band where absence of WiFi cannot be guaranteed (e.g. by regulation), LBT can be performed in bandwidth units of 20 MHz.

For 5 GHz band, having a 16 μs gap to accommodate for the transceiver turnaround before the immediate transmission of the responding node is beneficial for NR-U, such as for supporting fast A/N feedback, and is permitted per regulation. Restrictions/conditions on when this option can be used will be further identified, e.g., in consideration of fair coexistence.

A 16 µs gap to accommodate for the transceiver turn-around before the immediate transmission of the responding node can also be applied to 6 GHz band if allowed by regulation, and restrictions/conditions on when this option can be used will be further identified, if fair coexistence criterion is defined for 6 GHz band.

For CWS adjustment procedure in NR-U, in addition to aspects considered in LTE LAA, NR-U may additionally consider at least the following aspects: Code Block group (CBG) based Hybrid Automatic Repeat Request ACK (HARQ-ACK) operation, NR scheduling and HARQ-feedback delays and processing times, wideband (>20 MHz) operation including Bandwidth Parts (BWPs), Configured grant operation. For initiation of a COT by the gNB (operating as an LBE device), the channel access schemes in Table 1 are used.

TABLE 1

Channel access schemes for initiating a COT by gNB as Load based Equipment (LBE) device

|  | Cat 2 LBT | Cat 4 LBT |
| --- | --- | --- |
| Discovery Reference Signal (DRS) alone or multiplexed with non-unicast data (e.g. OSI, paging, RAR) | When the DRS duty cycle ≤1/20, and the total duration is up to 1 ms: 25 µs Cat 2 LBT is used (as in LAA) | When DRS duty cycle is >1/20, or total duration >1 ms |
| DRS multiplexed with unicast data | N/A except for the cases discussed in the Note below | Channel access priority class is selected according to the multiplexed data |
| Physical Downlink Control Channel (PDCCH) and Physical Downlink Shared Channel (PDSCH) | N/A except for the cases discussed in the Note below | Channel access priority class is selected according to the multiplexed data |

Note:
Applicability of an LBT scheme other than Cat 4 LBT for control messages related to initial/random access, mobility, paging, reference signals only, and PDCCH-only transmissions, e.g. "RACH message 4", handover command, Group Common PUCCH (GC-PDCCH), or short message paging transmitted either alone or when multiplexed with DRS have been discussed. Further details related to exceptions in this note can be determined when specifications are developed.

At least for the case where a Downlink (DL) burst follows an Uplink (UL) burst within a gNB-initiated COT and there is no gap larger than 25 µs between any two transmissions in the COT, the channel access schemes in Table 1 apply for the DL burst following a UL burst.

TABLE 2

Channel access schemes for a DL burst follows a UL burst within a gNB-initiated COT as LBE device

| Cat 1 Immediate transmission | Cat 2 LBT |
| --- | --- |
| When the gap from the end of the scheduled UL transmission to the beginning of the DL burst is up to 16 µsec | When the gap from the end of the scheduled UL transmission to the beginning of the DL burst is larger than 16 µsec but not more than 25 µsec |

Note:
a DL burst is defined as a set of transmissions from a given gNB having no gaps or gaps of no more than 16 µs. Transmissions from a gNB having a gap of more than 16 µs are considered as separate DL bursts.

Within a gNB-initiated COT, an UL burst for a UE consisting of one or more of PUSCH, PUCCH, PRACH, and SRS follows the channel access schemes in Table 3.

TABLE 3

Channel access schemes for a UL burst within a gNB-initiated COT as LBE device

| Cat 1 Immediate transmission | Cat 2 LBT | Cat 4 LBT |
| --- | --- | --- |
| When the gap from the end of the DL transmission to the beginning of the UL burst is not more than 16 µsec. Note: Maximum limits of the duration of the UL burst other than those already derived from MCOT duration limits should be further discussed when specifications are developed. | For any of the following cases: When the gap between any two successive scheduled/granted transmissions in the COT is not greater than 25 µsec For the case where a UL transmission in the gNB initiated COT is not followed by a DL transmission in the same COT Note: the duration from the start of the first transmission within the channel occupancy until the end of the last transmission in the same channel occupancy shall not exceed 20 ms. | N/A |

Note:
An UL burst is defined as a set of transmissions from a given UE having no gaps or gaps of no more than 16 µs. Transmissions from a UE having a gap of more than 16 µs are considered as separate UL bursts. The number of LBT attempts within a COT should be determined when specifications are developed.

For initiation of a COT by the UE, the channel access schemes in Table 4 are used.

TABLE 4

Channel access schemes for initiating a COT by UE as LBE device

|  | Cat 2 LBT | Cat 4 LBT |
| --- | --- | --- |
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Note 1:
If the COT includes multiple signals/channels with different channel access categories/priority classes, the highest channel access priority class value and highest channel access category among the channel access priority classes and channel access categories corresponding to the multiple signals/channels applies.
Note 2:
Applicability of a channel access scheme other than Cat 4 for the following signals/channels have been discussed and details are to be determined when the specifications are developed:
UL control information including User Class Identifier (UCI) only on Physical Uplink Shared Channel (PUSCH), e.g. HARQ-ACK, Scheduling Request, and Channel State Information
Random Access For Frame based Equipment (FBE) mode of operation, gNB acquires COT with Cat2 immediately prior to the fixed frame period. Within the gNB acquired COT, if a gap is <=16 µs, Cat 1 channel access scheme can be used by the gNB and associated UEs. Within the gNB acquired COT, if a gap is >16 µs, Cat 2 channel access scheme should be used by the gNB and associated UEs. Note this channel access mechanisms are intended to be aligned with any regulations for FBE operation.

For channel access and transmissions in NR-U the mechanisms and associated signaling adopted by LTE LAA (e.g. standardized QoS Class Identifier (QCI) to access priority mapping for DL and UL, how access priority per logical channel is determined for scheduled UL and AUL transmissions etc.) are used as the baseline.

The two modes of operations, i.e., Load Based Equipment (LBE) and Frame Based Equipment (FBE), are applicable exclusively each other and have their own benefits and drawbacks. For example, compared to LBE, FBE has, e.g., a fixed overhead for idle time during a frame. Compared to FBE, LBE has a higher complexity for channel access due to performing random backoff.

Therefore, it is desired to have a solution with sufficient flexibility to operate with the two LBT modes in unlicensed spectrum.

SUMMARY

In view of the above, it is an object to provide a more flexible solution for determining the LBT mode for the wireless network node or the terminal device operating in unlicensed spectrum.

According to one aspect of the disclosure, there is provided a method for implemented in a wireless network node operating in an unlicensed spectrum, comprising: determining a Listen-before-Talk LBT mode for a terminal device; and sending a first indication indicating the determined LBT mode to the terminal device.

The LBT mode may comprise a Frame Based Equipment FBE mode in which LBT operation is performed at fixed time instants, or a Load Based Equipment LBE mode in which LBT operation is performed at any time instant.

In FBE mode, if a LBT operation fails, a next LBT operation is performed after a fixed time interval, and in LBE mode, if a LBT operation fails, a next LBT operation is performed after a random time interval.

The first indication is sent via at least one of system information, paging message, Downlink Control Information DCI, Media Access Control Element MAC CE signaling, Radio Resource Control RRC signaling and handover command.

The determining the LBT mode may comprise measuring whether the cell is in rush hour, and determining the LBT mode according to the measuring result.

The determining the LBT mode may comprise judging whether a neighboring radio access technology RAT system exists within a time period; and determining the LBE mode according to the judging result.

The judging whether a neighboring RAT system exists may be based on measurements from the wireless network node or the terminal device, or based on signaling/information exchanged between the neighboring RAT system and the wireless network node.

The determining the LBT mode may comprise receiving a report from the terminal device regarding traffic load or Quality of Service QoS requirement of the terminal device, or a report regarding a neighboring RAT system; and determining the LBT mode based on the report.

The report from the terminal device may comprise at least one of a network type identifier, a cell ID, a received power density, a received signal strength, a DL timing difference between the wireless network node and a wireless network node of the neighboring RAT system, and an incoming direction difference between the wireless network node and a wireless network node of the neighboring RAT system.

The report from the terminal device may be triggered periodically or by events when transmission from the neighboring RAT system is detected by the terminal device.

The neighboring RAT system may comprise a wireless fidelity WIFI system, a Long Term Evolution LTE Licensed Assisted Access LAA system, a New Radio Unlicensed NR-U system, a LTE system and a NR system.

The determining the LBT mode may comprise receiving from the terminal device its preference on the LBT mode, and determining the LBT mode according to the preference if a number of a same preference reaches a threshold amount.

The determining the LBT mode may further comprise determining the LBT mode for the wireless network node.

The determined LBT mode for the terminal device may be same as the determined LBT mode for the wireless network node.

The determined LBT mode for the terminal device may be different from the determined LBT mode for the wireless network node.

The determining the LBT mode may be performed per sub-band, per channel, per carrier, per cell, per connection or per Bandwidth Part.

The wireless network node may receive from a terminal device a capability bit indicating the LBT mode that the terminal device supports.

The wireless network node may receive a notifying or negotiating message from a neighboring wireless network node about the LBT mode selected by the neighboring wireless network node.

The determining LBT mode may comprise deciding whether to switch the current LBT mode to the LBT mode selected by the neighboring wireless network node when the two are different; and send to the neighboring wireless network node a second indication indicating the LBT mode determined by the wireless network node.

The wireless network node may send a notifying or negotiating message to a neighboring wireless network node about the LBT mode determined by the wireless network node.

The wireless network node may determine the LBT mode of all cells within a cell cluster jointly based on reports collected from the cells within the cell cluster.

The determined LBT mode for wireless network nodes of the cell cluster may be different from the determined LBT mode for terminal devices of the cell cluster.

The determined LBT mode for wireless network nodes of the cell cluster may be the same as the determined LBT mode for terminal devices of the cell cluster.

The wireless network node may determine two sets of LBT configurations for one or more of Physical Random Access Channel PRACH transmission, Physical Uplink Control Channel PUCCH transmission, Sounding Reference Signal SRS transmission and Physical Uplink Shared Channel PUSCH transmission respectively, wherein each set of LBT configurations is associated with a LBT mode.

The LBT mode may be associated with one or more LBT configurations.

According to another aspect of the disclosure, there is provided a method implemented in a terminal device operating in an unlicensed spectrum, comprising receiving, from a wireless network node, a first indication indicating a Listen-before-Talk LBT mode for the terminal device; and performing a LBT operation according to the indicated LBT mode.

The LBT mode may comprise a Frame Based Equipment FBE mode in which LBT operation is performed at fixed time instants, or a Load Based Equipment LBE mode in which LBT operation is performed at any time instant.

In FBE mode, if a LBT operation fails, a next LBT operation is performed after a fixed time interval, and in LBE mode, if a LBT operation fails, a next LBT operation is performed after a random time interval.

The indication may be received via at least one of system information, paging messages, Downlink Control Information DCI, Media Access Control Element MAC CE signaling, Radio Resource Control RRC signaling and handover command.

The terminal device may measure whether it is in rush hour or whether a neighboring radio access technology RAT system exists; and sending a report to the wireless network node.

The report from the terminal device may comprise traffic load, QoS requirement of the terminal device, or the information of the neighboring RAT system.

The report from the terminal device may comprise at least one of a network type identifier, a cell ID, a received power density, a received signal strength, a DL timing difference between the wireless network node and a wireless network node of the neighboring RAT system, and an incoming direction difference between the wireless network node and a wireless network node of the neighboring RAT system.

The report from the terminal device may be triggered periodically or by events when transmission from the neighboring RAT system is detected by the terminal device.

The neighboring RAT system may comprise at least one of: a WIFI system, a LTE LAA system, a NR-U system, a LTE system and a NR system.

The terminal device may send a second indication to the wireless network node indicating preference of the terminal device on the LBT mode.

The terminal device may send a capability bit indicating the LBT mode that the terminal device supports.

The terminal device may perform the LBT operation according to a default LBT mode before receiving the first indication.

According to another aspect of the disclosure, there is provided a wireless network node operating in unlicensed spectrum, comprising: a determining module for determining a Listen-before-Talk, LBT, mode for a terminal device, and a sending module for sending a first indication indicating the determined LBT mode to the terminal device.

According to another aspect of the disclosure, there is provided a wireless network node operating in an unlicensed spectrum, comprising: one or more processors; and one or more memories comprising computer program codes, when executed by the one or more processors, cause the wireless network node executing the method implemented in the wireless network node operating in an unlicensed spectrum according to the embodiments of the invention.

According to another aspect of the disclosure, there is provided a terminal device operating in unlicensed spectrum, comprising: a receiving module for receiving, from a wireless network node, an indication indicating a Listen-before-Talk LBT mode for the terminal device; and a performing module for performing a LBT operation according to the indicated LBT mode.

According to another aspect of the disclosure, there is provided a terminal device operating in unlicensed spectrum, comprising: one or more processors; and one or more memories comprising computer program codes, when executed by the one or more processors, cause the terminal device executing the method implemented in the terminal device operating in an unlicensed spectrum according to the embodiments of the invention.

According to another aspect of the disclosure, there is provided a computer-readable medium having computer program stored thereon, wherein the computer program comprises computer program codes for performing the method implemented in the terminal device or the method implemented in the wireless network node operating in an unlicensed spectrum according to the embodiments of the invention.

According to the embodiments of the present disclosure, the wireless network node or the terminal device (e.g., in an NR-U system) can gain benefits caused by the flexible configuration/scheduling of different LBT modes (e.g., FBE and LBE), for example, have a lower complexity and lower overhead, etc., in an integral point of view. Therefore, network utilization efficiency is improved and service requirements may be met more efficiently.

BRIEF DESCRIPTION OF THE DRAWINGS

The above and other objects, features and advantages will be more apparent from the following description of embodiments with reference to the accompanied drawings, in which:

FIGS. 12 to 15 are flowcharts illustrating methods implemented in a communication system including a host computer, a base station and a user equipment.

DETAILED DESCRIPTION

Figures 1, 2:
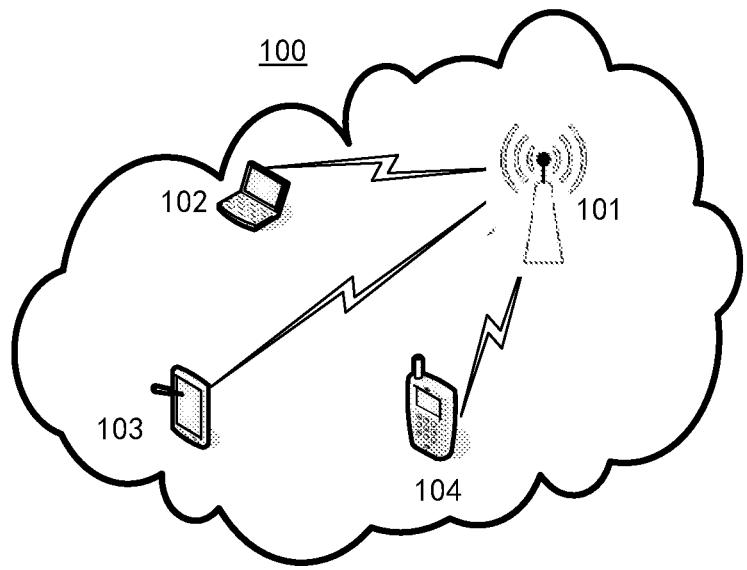
FIG. 1 is a schematic diagram illustrating a simplified network scenario according to an embodiment of the invention.
FIG. 2 is a schematic flowchart illustrating a method implemented in a wireless network node operating in unlicensed spectrum according to an embodiment of the invention.

Following embodiments of the present disclosure are described in detail with reference to the accompanying drawings. It shall be understood that these embodiments are discussed only for the purpose of enabling those skilled persons in the art to better understand and thus implement the present disclosure, rather than suggesting any limitations on the scope of the present disclosure.

In the context, the term "wireless network node" may refer to any network device in a wireless communication network via which a terminal device or User Equipment (UE) may access the network and receives services therefrom and in which the embodiments of the present disclosure may be applied. Generally, The "wireless network node" may refer to base station devices, for example, a Node B (NodeB or NB), an evolved NodeB (eNodeB or eNB), or gNodeB (gNB), a Remote Radio Unit (RRU), a Radio Header (RH), a Remote Radio Head (RRH), a relay, a low power node such as a femto, a pico, and so forth. Yet further examples of the network device may include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes. More generally, the network device may represent any suitable device (or group of devices) capable, configured, arranged, and/or operable to enable and/or provide UE access to the wireless communication network or to provide some service to UE that has accessed the wireless communication network.

The term "terminal device" refers to any end device that can access a wireless communication network and receive services therefrom. By way of example and not limitation, the terminal device refers to a mobile terminal, user equipment (UE), or other suitable devices. Generally, the UE refers to any end device that can access a wireless communication network and receive services therefrom. By way of example and not limitation, the UE may refer to a mobile terminal or other suitable user devices. The UE may be, for example, a Subscriber Station (SS), a Portable Subscriber Station, a Mobile Station (MS), or an Access Terminal (AT). The UE may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a UE may be configured to transmit and/or receive information without direct human interaction. For instance, a UE may be designed to transmit information to a network device on a predetermined schedule, when triggered by an internal or external event, or in response to requests from the wireless communication network. Instead, a UE may represent a device that is intended for sale to, or operation by, a human user but that may not initially be associated with a specific human user.

Generally, the term "wireless communication network" may refer to a network following any suitable communication standards, such as new radio (NR), Long Term Evolution (LTE), LTE-Advanced (LTE-A), Wideband Code Division Multiple Access (WCDMA), High-Speed Packet Access (HSPA), and any further suitable networks to be developed. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the First Generation), 2G (the Second Generation), 2.5G, 2.75G, 3G (the Third Generation), 4G (the Fourth Generation), 4.5G, 5G (the Fifth Generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

Channel access mechanisms for NR-U include two modes of operations, i.e., Load Based Equipment (LBE) and Frame Based Equipment (FBE). For FBE, channel sensing is performed at fixed time instants. If the channel is determined busy, the base station adopts a fixed back-off and performs LBT again after the fixed backoff. For LBE, channel sensing can be performed at any time instance, and random back-off is adopted when the channel is determined to be busy.

In the following description, mechanism for a wireless network node (e.g., a NR-U cell/system) to select/configure a suitable mode of operation (i.e., either LBE or FBE) or perform a dynamic mode switch between the two LBT modes depending on, e.g., monitoring whether there is any LBE device in the cell/system via signaling means is described in detail.

FIG. 1 is a diagram illustrating a simplified network scenario applicable in the present disclosure. The schematic network scenario includes a wireless network node, e.g., a base station device (e.g., gNB) 101 and terminal devices 102, 103, 104 which may be connected to the base station device to access the network services. In the embodiment, the wireless network node and the terminal devices work in unlicensed band. As used herein, a downlink (DL) transmission refers to transmission from the wireless network node to a UE/terminal device, and an uplink (UL) transmission refers to transmission in an opposite direction.

FIG. 2 is a schematic flowchart illustrating a method 200 implemented in a wireless network node operating in unlicensed spectrum according to an embodiment of the invention.

The method 200 implemented in operating in unlicensed spectrum includes: in step 201, the wireless network node determines a Listen-before-Talk, LBT, mode for a terminal device; and in step 202, the wireless network node sends a first indication indicating the determined LBT mode to the terminal device.

In the embodiment, the LBT mode can be a Frame Based Equipment FBE mode in which LBT is performed at fixed time instants. Alternatively, the LBT mode can be a Load Based Equipment LBE mode in which LBT is performed at any time instant.

In FBE mode, if a LBT operation fails, the next LBT operation will be performed after a fixed time interval. In LBE mode, if a LBT operation fails, the next LBT operation will be performed after a random time interval.

In the embodiment, the indication may be sent via at least one of system information, paging message, Downlink Control Information DCI, Media Access Control Element MAC CE signaling, Radio Resource Control RRC signaling and handover command.

For example, in each cell, the gNB may signal the LBT mode via the above signaling. The system information may provide a cell or system specific configuration on the mode. The Paging message may provide a configuration on the mode for paged one or more UEs. DCI or MAC CE may provide dynamic configuration on the mode for one or more UEs. Therefore, the mode can be dynamically changed for one or more UEs. RRC signaling or handover command may also provide dynamic configuration on the mode for one or more UEs.

The signaling means are applicable for both UL and DL transmissions. In some cases, the UE may not need to know the mode that a DL transmission uses, since it may depend on network implementation. However, as an option, the LBT mode for a UL transmission (i.e., for the terminal device) may follow the LBT mode for a DL transmission (i.e., for the wireless network node). The chosen mode may be synchronized between a gNB and its associated UEs.

As an example, a gNB may decide when to perform mode switch for DL transmission, UL transmission or both UL transmission and DL transmission based on criteria. Herein, the mode for DL transmission refers to the mode for the wireless network node (e.g., gNB), and the mode for UL transmission refers to the mode for the terminal device (e.g., NR-U UE).

In an embodiment, the wireless network node may determine the LBT mode by measuring whether the cell is in rush hour and determining the LBT mode according to the measuring result. The measurement may be performed by the wireless network node or the terminal device. If the cell is in rush hour, the FBE mode is determined as the LBT mode (for UL, DL, or both). Otherwise, the LBE mode is determined.

Figure 3:
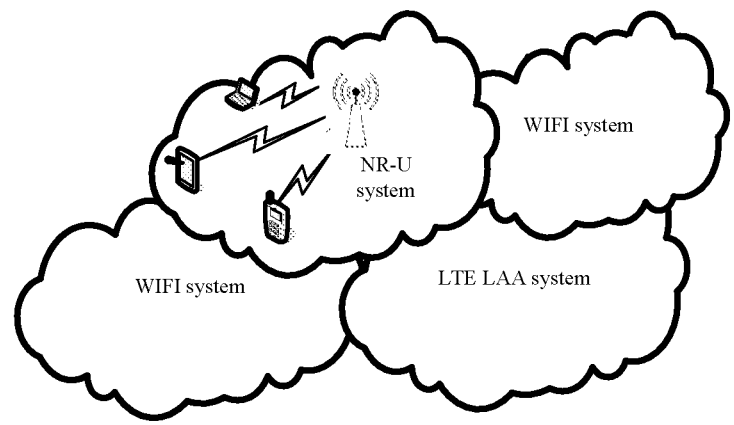
FIG. 3 is a schematic diagram illustrating a simplified network scenario according to another embodiment of the invention.

Alternatively, the wireless network node may determine the LBT mode by judging whether a neighboring radio access technology RAT system exists within a time period and determining the LBE mode according to the judging result. If there is a time period during which the LBE nodes or LBE mode based transmissions are absent in the cell or system, the LBT mode can be determined as FBE mode. FIG. 3 is a schematic diagram illustrating a simplified network scenario according to another embodiment of the invention. The network scenario in FIG. 3 schematically includes various neighboring radio access technology RAT systems, for example NR-U system, WIFI system, LTE LAA system, etc.

The judging whether a neighboring RAT system exists may be based on measurements from the wireless network node or the terminal device. The judging operation may alternatively be based on signaling/information exchanged between the neighboring RAT system and the wireless network node.

As an example, a UE or gNB can measure whether there is on-going or recent WIFI/LTE LAA transmissions, this may require some signaling/information exchanged between a NR-U gNB/LTE eNB and a WiFi access point/gateway. The signaling/information exchange may also occur between a NR-U gNB and a LTE eNB. In these criteria, the network may configure a time period during which the LBE nodes or LBE mode based transmissions are absent in the cell or system, and in this case, the mode can be switched to FBE.

Alternatively, the wireless network node may determine the LBT mode by receiving a report from the terminal device regarding traffic load or Quality of Service QoS requirement of the terminal device, or a report regarding a neighboring RAT system and determining the LBT mode based on the report.

For example, a UE may report to the gNB on whether there is a heavy traffic or a traffic with critical QoS requirements on that UE, or whether there is on-going neighboring Radio Access Technology (e.g., WIFI/LTE LAA) transmissions.

According to the embodiment, the report from the terminal device may include at least one of a network type identifier, a cell ID, a received power density, a received signal strength, a DL timing difference between the wireless network node and a wireless network node of the neighboring RAT system, and an incoming direction difference between the wireless network node and a wireless network node of the neighboring RAT system.

As an example, a UE may report to its serving gNB with information on the other surrounding RAT systems, such as an WiFi system, another LAA system, an NR-U system from another NR-U operator etc. The report may include:
  if the RAT system is based on 3GPP technology, the PLMN ID, the received power density (e.g. SSB RSRP or CSI-RS RSRP) and the cell ID, the DL timing differences between the detected base station/access point and the serving gNB, the incoming direction differences between the detected base station and the serving gNB etc.
  If the RAT system is based on IEEE system such as WiFi, the UE may report is Service Set Identifier (SSID), received signal strength, incoming direction differences between the detected base station/access point and the serving gNB.

As an example, based on the reports from the served UEs, the serving gNB can determine the mode, the mode may be cell specific or UE specific.

As an example, based on the measurement report(s) from one or more UEs, the serving gNB can configure if LBE or FBE mode is applied for the one or more UE.

As an example, based on the measurement report(s) from one or more UEs in a beam direction (i.e. Synchronization Signal Block SSB (or Channel State Information Reference Signal CSI-RS) beam or SSB (or CSI-RS) beam set), together with measurement results made by the gNB, the serving gNB may determine a mode (either LBE or FBE) for these UEs. The selected mode may be applicable to DL or UL transmissions.

The report from the terminal device may be triggered periodically or by events when transmission from the neighboring RAT system is detected by the terminal device.

As an example, the neighboring RAT system may include, e.g., a wireless fidelity WIFI system, a Long Term Evolution LTE Licensed Assisted Access LAA system, a New Radio Unlicensed NR-U system, a LTE system and a NR system.

Alternatively, the wireless network node may determine the LBT mode by receiving from the terminal device its preference on the LBT mode and determining the LBT mode according to the preference if a number of a same preference reaches a threshold amount.

For example, a UE may determine a preferred mode according to its local measurements and a preconfigured rule (e.g. FBE can be applied if no neighboring transmitter from a different RAT or different network system for configured time period), and indicate a preferred mode to its serving gNB. The indication may be signaled via a MAC CE, PUCCH control signaling, or a RRC signaling, or other signaling means. The gNB may or may not decide to switch mode for this UE. In another case, the gNB may not decide to change the mode until reception of a sufficient amount of indications from UEs on a mode.

In an embodiment, the LBT mode may also be determined for the wireless network node itself. The determined LBT mode for the terminal device may be the same as the determined LBT mode for the wireless network node, or different from the determined LBT mode for the wireless network node.

In an embodiment, the LBT mode may also be determined per sub-band, per channel, per carrier, per cell, per connection or per Bandwidth Part.

For example, for a UE configured with multiple/dual connectivity, or a carrier aggregation, each connection/cell may be configured with different mode. In this case, the UE may apply different mode for control signaling and data transmissions occurring on different cells.

As another example, during a handover procedure, when a random access procedure to a target cell is perform in a unlicensed carrier, the target cell can configure the LBT mode of the handover UE in the handover command.

As another example, for a UE configured with one or multiple SUL carriers for UL/DL coverage extension purpose, each carrier may be configured with a different mode. In this case, the UE may apply different mode for control signaling and data transmissions occurring on different carriers. For instance, FBE mode is applied for uplink control channels and LBE mode is used for PUSCH transmissions.

In an embodiment, the wireless network node may receive from a terminal device a capability bit indicating the LBT mode that the terminal device supports.

For example, capability bit(s) may be defined to indicate which mode(s) (i.e., LBE and/or FBE) is supported by a NR-U UE. Some UEs may support both modes, while some other UEs may support one of the modes.

In an embodiment, the wireless network node may receive a notifying or negotiating message from a neighboring wireless network node about the LBT mode selected by the neighboring wireless network node. Further, the wireless network node may decide whether to switch the current LBT mode to the LBT mode selected by the neighboring wireless network node when the two are different. The LBT mode may be switched for the terminal device or the wireless network. The wireless network node may also send to the neighboring wireless network node an indication indicating the LBT mode determined by the wireless network node after considering the notifying or negotiating message. The wireless network node may send a notifying or negotiating message to a neighboring wireless network node about the LBT mode determined by the wireless network node to negotiate with the neighboring wireless network node.

For example, a cell can notify or negotiate with a neighboring cell with respect to the LBT mode. When a cell (or base station) receives such notification message from a neighboring cell (or base station), this cell can determine if a LBT mode switch is needed considering the LBT modes chosen in the neighboring cells. When a cell (or base station) receives a negotiation message from a neighboring cell (or base station), this cell may confirm with information on its selected mode.

Figure 4:
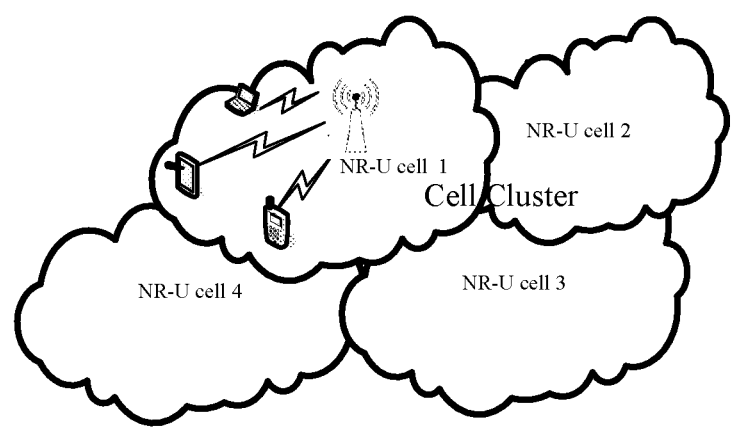
FIG. 4 is a schematic diagram illustrating a simplified network scenario according to a still another embodiment of the invention.

FIG. 4 is a schematic diagram illustrating a simplified network scenario according to a still another embodiment of the invention. As an example, the network scenario in FIG. 4 shows a cell cluster schematically.

In the embodiment, the wireless network node may determine the LBT mode of all cells within a cell cluster jointly based on reports collected from the cells within the cell cluster.

The determined LBT mode for wireless network nodes of the cell cluster may be the same or different from the determined LBT mode for terminal devices of the cell cluster.

As an example, a cell (or base station) cluster may determine the LBT mode jointly. Based on the collected reports provided from cluster members, a coordination manager (a control entity collocated in OAM server or at a base station) may determine a LBT mode (e.g., either FBE or LBE) which is commonly used in the cluster. When it is necessary, a mode switch is also decided by the manager. After a mode switch, all cluster members apply another mode at the same time. In the cluster, all DL transmission may apply the same mode, while all UL transmission may apply the same or different mode as DL transmission.

In an embodiment, the wireless network node may determine two sets of LBT configurations for one or more of Physical Random Access Channel PRACH transmission, Physical Uplink Control Channel PUCCH transmission, Sounding Reference Signal SRS transmission and Physical Uplink Shared Channel PUSCH transmission respectively, wherein each set of LBT configurations is associated with a LBT mode.

As an example, in a cell, there may be two sets of LBT configurations for PRACH, PUCCH, SRS and PUSCH transmissions. Each set of configurations are associated with a different LBT mode respectively. Whenever a mode switch has occurred, the cell or UEs select corresponding LBT configurations for PRACH/PUCCH/SRS/PUSCH transmissions given the LBT mode chosen.

In the embodiments, the LBT mode may be associated with one or more LBT configurations.

The configurable LBT schemes (i.e., LBT configurations) include at least one of the below LBT categories, but not limited to below examples.

Category 1: Immediate transmission after a short switching gap
This is used for a transmitter to immediately transmit after a UL/DL switching gap inside a COT.

Category 2: LBT without random back-off
The duration of time that the channel is sensed to be idle before the transmitting entity transmits is deterministic.

Category 3: LBT with random back-off with fixed size of contention window
The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with variable size of contention window
The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For example, in LBE mode, a UE or gNB may choose LBT option among Category 1, 2, 3 and 4 to sense a channel, while in FBE mode, a UE or gNB may choose LBT option among category 1 and 2 to sense a channel.

To provide differentiation to channel access priorities based on the type of traffic served (e.g. VoIP, video, best effort, or background), four LBT priority classes are defined with different contention window sizes (CWS) and MCOT (after the transmitter has gained access to the channel, the transmitter is only allowed to transmit for a limited duration referred to as the maximum channel occupancy time (MCOT). Table 5 summarizes the MCOT and CWS for the downlink channel access priority classes, while Table 6 summarizes the MCOT and CWS for the uplink channel access priority classes.

TABLE 5

Channel Access Priority Class

| Channel Access Priority Class | MCOT | allowed CWS sizes |
|---|---|---|
| 1 | 2 ms | {3, 7} |
| 2 | 3 ms | {7, 15} |
| 3 | 8 or 10 ms | {15, 31, 63} |
| 4 | 8 or 10 ms | {15, 31, 63, 127, 255, 511, 1023} |

TABLE 6

Channel Access Priority Class for UL

| Channel Access Priority Class | MCOT | allowed CWS sizes |
|---|---|---|
| 1 | 2 ms | {3, 7} |
| 2 | 4 ms | {7, 15} |
| 3 | 6 ms or 10 ms | {15, 31, 63, 127, 255, 511, 1023} |
| 4 | 6 ms or 10 ms | {15, 31, 63, 127, 255, 511, 1023} |

The below embodiments are described in the context of NR unlicensed spectrum (NR-U). Our solutions are not limited to NR-U scenarios. They are also applicable to other unlicensed operation scenarios such as LTE LAA/eLAA/feLAA. In the below embodiments, we use the wording "mode" or "LBT mode" for the same meaning, meaning that a UE operates as either "a FBE device" or "a LBE device".

Figure 5:
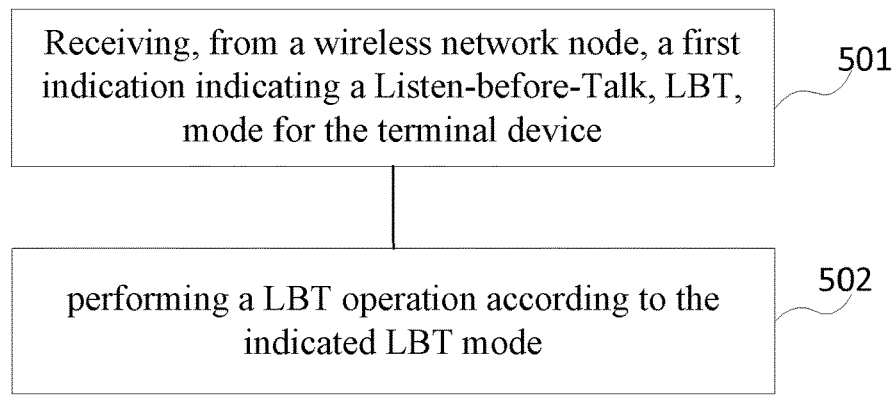
FIG. 5 is a schematic flowchart illustrating a method implemented in a terminal device operating in unlicensed spectrum according to an embodiment of the invention.

FIG. 5 is a schematic flowchart illustrating a method 500 implemented in a terminal device operating in unlicensed spectrum according to an embodiment of the invention.

The method 500 includes: in step 501, the terminal device receives, from a wireless network node, a first indication indicating a Listen-before-Talk LBT mode for the terminal device; and in step 502, the terminal device performs a LBT operation according to the indicated LBT mode.

The LBT mode may be a Frame Based Equipment FBE mode in which LBT is performed at fixed time instants, or a Load Based Equipment LBE mode in which LBT is performed at any time instant.

In FBE mode, if a LBT operation fails, the next LBT operation will be performed after a fixed time interval. In LBE mode, if a LBT operation fails, the next LBT operation will be performed after a random time interval.

The indication may be received from the wireless network node via at least one of system information, paging messages, Downlink Control Information DCI, Media Access Control Element MAC CE signaling, Radio Resource Control RRC signaling and handover command.

In an embodiment, the terminal device may measure whether it is in rush hour or whether a neighboring radio access technology RAT system exists; and then send a report to the wireless network node.

The report from the terminal device may include traffic load, QoS requirement of the terminal device, or the information of the neighboring RAT system.

The report from the terminal device may include at least one of a network type identifier, a cell ID, a received power density, a received signal strength, a DL timing difference between the wireless network node and a wireless network node of the neighboring RAT system, and an incoming direction difference between the wireless network node and a wireless network node of the neighboring RAT system.

The report from the terminal device may be triggered periodically or by events when transmission from the neighboring RAT system is detected by the terminal device.

The neighboring RAT system may include at least one of a WIFI system, a LTE LAA system, a NR-U system, a LTE system and a NR system.

In an embodiment, the terminal device may send a second indication to the wireless network node indicating preference of the terminal device on the LBT mode.

In an embodiment, the terminal device may also send a capability bit indicating the LBT mode that the terminal device supports.

In an embodiment, the terminal device may perform the LBT operation according to a default LBT mode before receiving the first indication indicating the LBT mode from the wireless network node.

As example, the LBT mode (either FBE or LBE) for UL/DL transmission can be configured per subband or channel or carrier, or cell or BWP. In a further embodiment, a default LBT mode can be configured per subband or channel or carrier, or cell or BWP. Such default LBT mode is applied when there is no specific LBT mode configuration from the serving gNB. The mode can be reconfigured for a UE in RRC connected via signaling means defined in the above embodiments.

Other features similar to or corresponding to the ones in the embodiments implemented at the wireless network node side are also applicable to the embodiments implemented at the terminal device side and thus omitted here.

Figure 6:
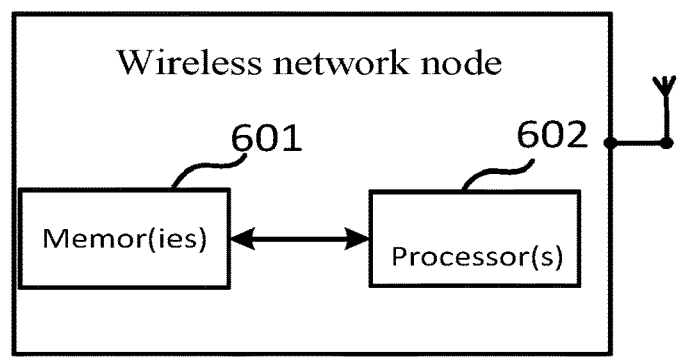
FIG. 6 is a schematic diagram illustrating a wireless network node operating in unlicensed spectrum according to an embodiment of the invention.

FIG. 6 is a schematic diagram illustrating a wireless network node 600 operating in unlicensed spectrum according to another embodiment of the invention.

The wireless network node 600 may include one or more processors 602 and one or more memories 601 comprising computer program codes, when executed by the one or more processors, cause the wireless network node executing the method implemented in wireless network node according to the above embodiments of the invention.

Figure 7:
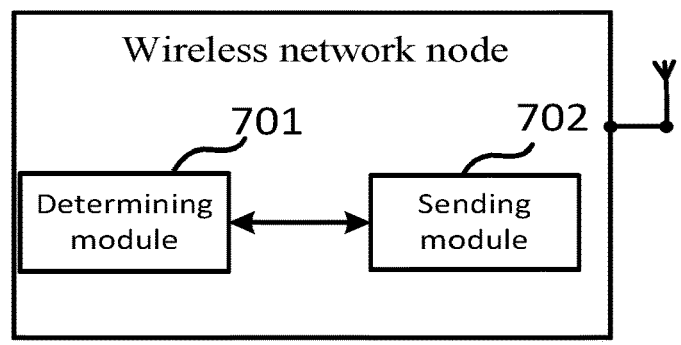
FIG. 7 is a schematic diagram illustrating a wireless network node operating in unlicensed spectrum according to another embodiment of the invention.

FIG. 7 is a schematic diagram illustrating a wireless network node 700 operating in unlicensed spectrum according to an embodiment of the invention.

The wireless network node 700 may include a determining module 701 and a sending module 702. The determining module 701 is configured to determine a Listen-before-Talk, LBT, mode for a terminal device. The sending module 702 is configured to send a first indication indicating the determined LBT mode to the terminal device.

Figure 8:
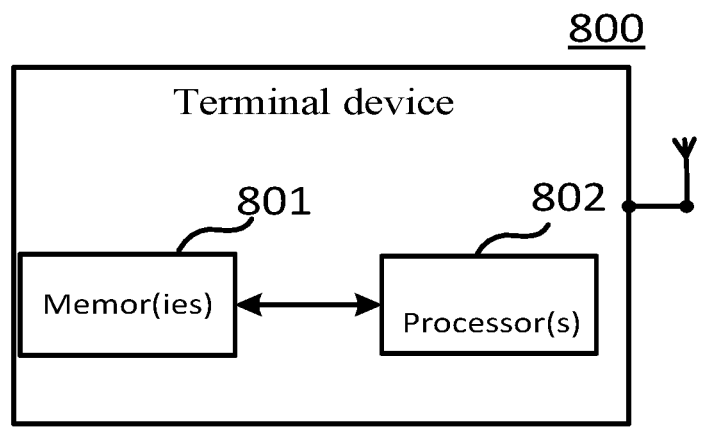
FIG. 8 is a schematic diagram illustrating a terminal device operating in unlicensed spectrum according to an embodiment of the invention.

FIG. 8 is a schematic diagram illustrating a terminal device 800 operating in unlicensed spectrum according to an embodiment of the invention.

The terminal device 800 may include one or more processors 802 and one or more memories 801 comprising computer program codes, when executed by the one or more processors, cause the terminal device executing the method implemented in the terminal device according to the above embodiments of the invention.

Figure 9:
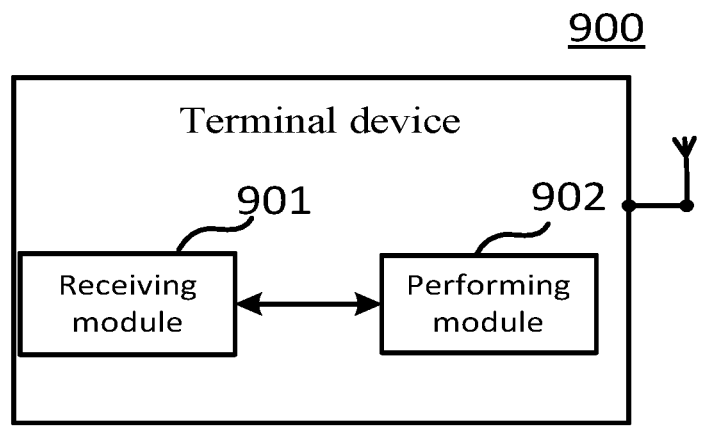
FIG. 9 is a schematic diagram illustrating a terminal device operating in unlicensed spectrum according to another embodiment of the invention.

FIG. 9 is a schematic diagram illustrating a terminal device 900 operating in unlicensed spectrum according to another embodiment of the invention.

The terminal device 900 may include a receiving module 901 and a performing module 902. The receiving module 901 is configured to receive, from a wireless network node, an indication indicating a Listen-before-Talk LBT mode for the terminal device; and the performing module 902 is configured to perform a LBT operation according to the indicated LBT mode.

The present disclosure also provides a computer-readable medium having computer program stored thereon, wherein the computer program comprises codes for performing the methods at terminal device side or at wireless network node side in accordance with the embodiments of the disclosure.

Figure 10:
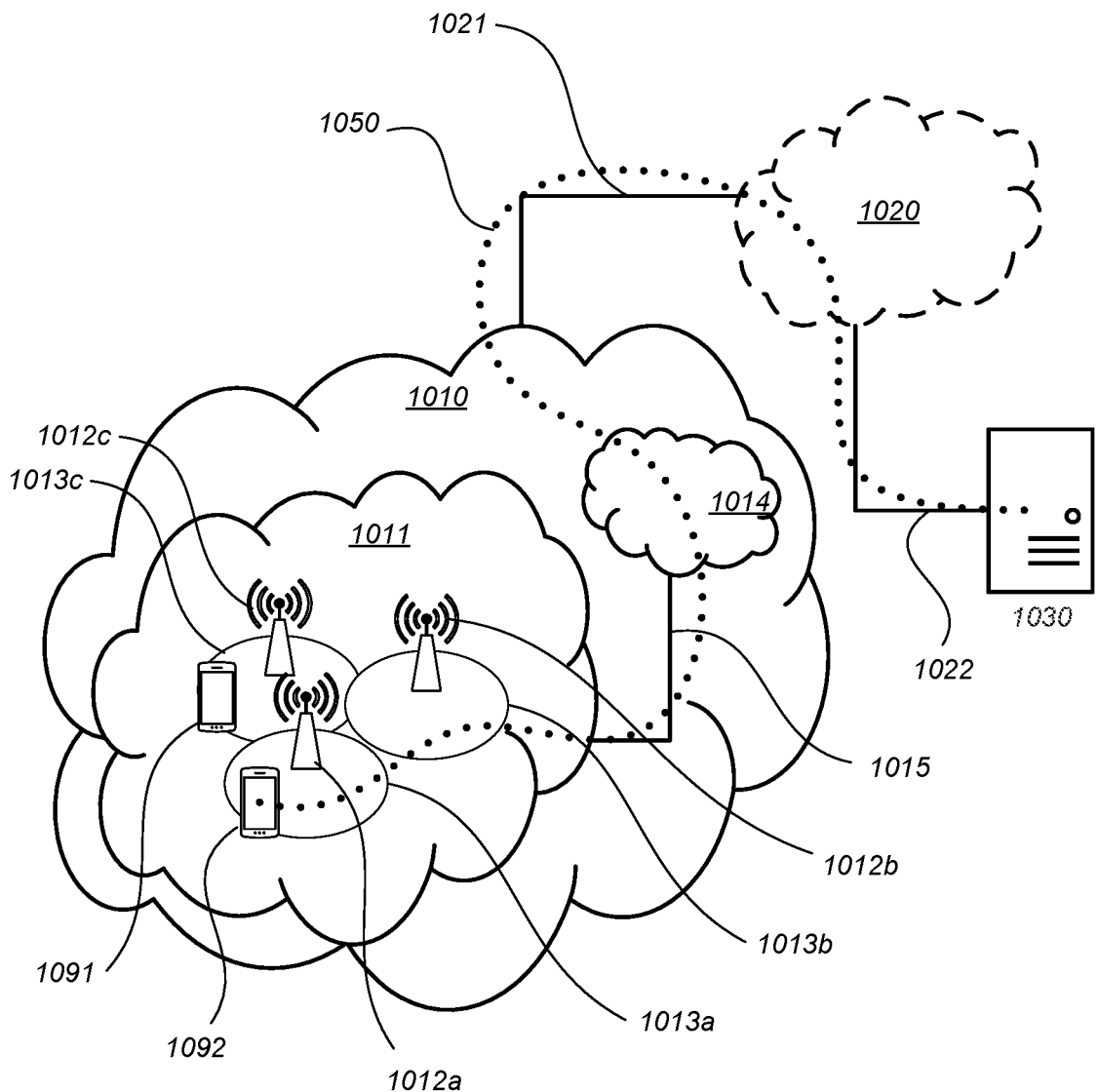
FIG. 10 schematically illustrates a telecommunication network connected via an intermediate network to a host computer.

FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to the core network 1014 over a wired or wireless connection 1015. A first user equipment (UE) 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Figure 11:
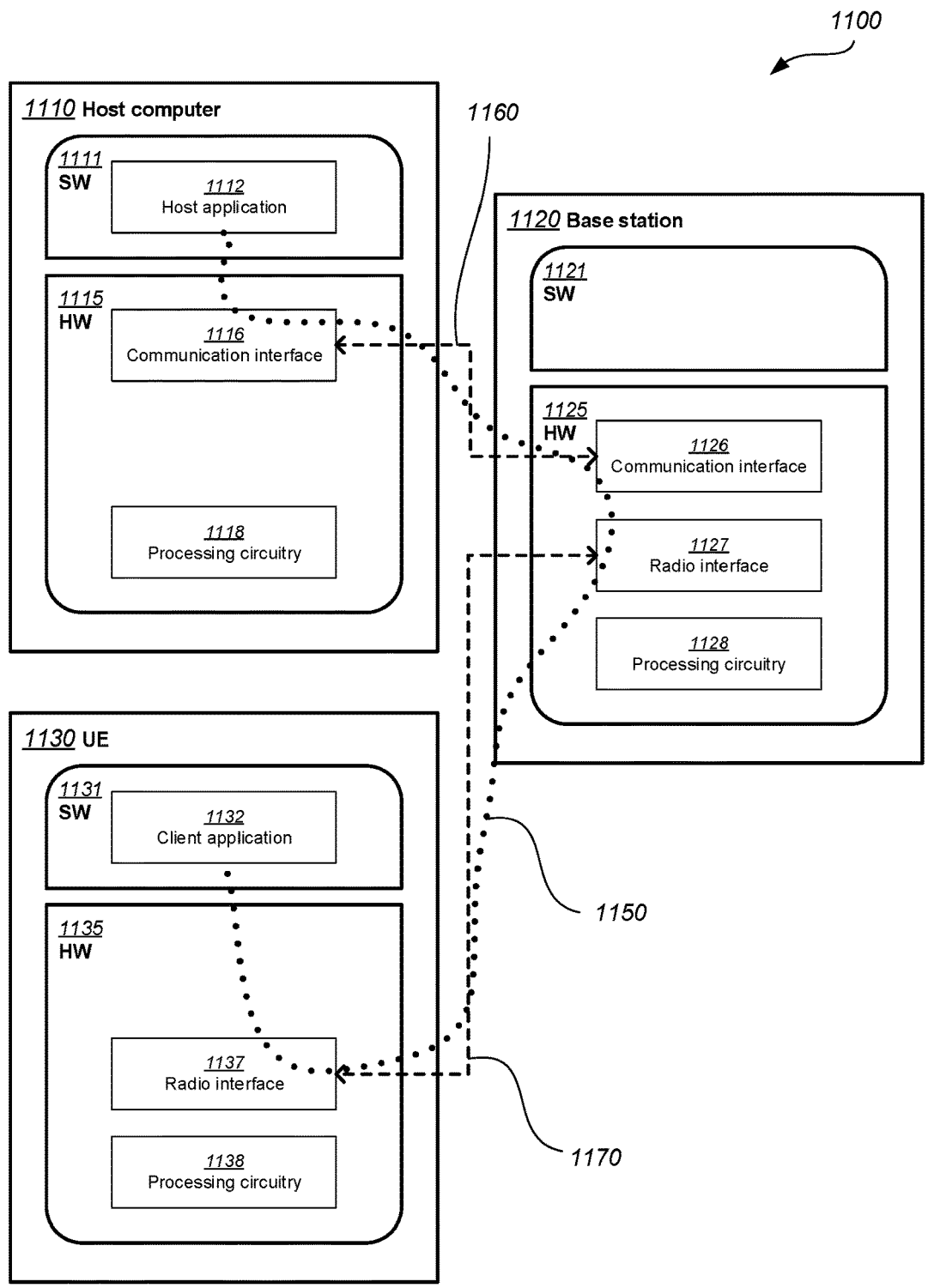
FIG. 11 is a generalized block diagram of a host computer communicating via a base station with a user equipment over a partially wireless connection.

FIG. 11 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

It is noted that the host computer 1110, base station 1120 and UE 1130 illustrated in FIG. 11 may be identical to the host computer 3230, one of the base stations 3212a, 3212b, 3212c and one of the UEs 3291, 3292 of FIG. 32, respectively. This is to say, the inner workings of these entities may be as shown in FIG. 11 and independently, the surrounding network topology may be that of FIG. 32.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may improve the latency and thereby provide benefits such as reduced user waiting time, better responsiveness, extended battery lifetime.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented in a wireless network node operating in an unlicensed spectrum, comprising:

receiving, from a terminal device, a capability bit indicating one or more Listen-before-Talk (LBT) modes that the terminal device supports;

determining an LBT mode for the terminal device based on the received capability bit;

determining a set of LBT configurations associated with the determined LBT mode; and sending configuration information indicating the determined LBT mode and the determined set of LBT configurations to the terminal device, wherein the determined set of LBT configurations relates to one or more of Physical Random Access Channel (PRACH) transmission, Physical Uplink Control Channel (PUCCH) transmission, Sounding Reference Signal (SRS) transmission and Physical Uplink Shared Channel (PUSCH) transmission.

2. The method according to claim 1, wherein the LBT mode is a Frame Based Equipment (FBE) mode in which LBT operation is performed at fixed time instants, and wherein the determined set of LBT configurations is configured to operate the terminal device in the FBE mode.

3. The method according to claim 1, wherein the configuration information is sent via at least one of:

system information, paging message, Downlink Control Information (DCI), Media Access Control Element (MAC CE) signaling, Radio Resource Control (RRC) signaling and handover command.

4. The method according to claim 1, wherein determining the LBT mode comprises:

measuring whether a cell is in rush hour, and determining the LBT mode according to a result of the measuring.

5. The method according to claim 1, wherein determining the LBT mode comprises:

judging whether a neighboring radio access technology (RAT) system exists within a time period; and determining the LBT mode according to a result of the judging.

6. The method according to claim 5, wherein the judging of whether a neighboring RAT system exists is based on measurements from the wireless network node or the terminal device, or based on signaling/information exchanged between the neighboring RAT system and the wireless network node.

7. The method according to claim 1, wherein the determining the LBT mode comprises:
receiving a report from the terminal device regarding traffic load or Quality of Service (QoS) requirement of the terminal device, or a report regarding a neighboring RAT system; and
determining the LBT mode based on the report.

8. The method according to claim 7, wherein the report from the terminal device comprises at least one of:
a network type identifier, a cell ID, a received power density, a received signal strength, a downlink (DL) timing difference between the wireless network node and a wireless network node of the neighboring RAT system, and an incoming direction difference between the wireless network node and a wireless network node of the neighboring RAT system.

9. The method according to claim 7, wherein the report from the terminal device is triggered periodically or by events when transmission from the neighboring RAT system is detected by the terminal device.

10. The method according to claim 5, wherein the neighboring RAT system comprises: a wireless fidelity (WIFI) system, a Long Term Evolution (LTE) Licensed Assisted Access (LAA) system, a New Radio Unlicensed (NR-U) system, a LTE system and a NR system.

11. The method according to claim 1, wherein determining the LBT mode comprises:
receiving from the terminal device its preference on the LBT mode, and
determining the LBT mode according to the preference if a number of a same preference reaches a threshold amount.

12. The method according to claim 1, wherein determining the LBT mode further comprises determining the LBT mode for the wireless network node.

13. The method according to claim 12, wherein the LBT mode determined for the terminal device is the same as the LBT mode determined for the wireless network node; or
wherein the LBT mode determined for the terminal device is different from the LBT mode determined for the wireless network node.

14. The method according to claim 1, wherein determining the LBT mode is performed per sub-band, per channel, per carrier, per cell, per connection or per Bandwidth Part.

15. The method according to claim 1, further comprising receiving a notifying or negotiating message from a neighboring wireless network node about a LBT mode selected by the neighboring wireless network node.

16. The method according to claim 15, wherein determining the LBT mode comprises:
deciding whether to switch a current LBT mode to the LBT mode selected by the neighboring wireless network node, when the two modes are different; and
sending, to the neighboring wireless network node, a second indication indicating the LBT mode determined by the wireless network node.

17. The method according to claim 1, further comprising sending a notifying or negotiating message to a neighboring wireless network node about the LBT mode determined by the wireless network node.

18. The method according to claim 1, further comprising determining a LBT mode of all cells within a cell cluster jointly based on reports collected from the cells within the cell cluster.

19. The method according to claim 18, wherein the LBT mode determined for wireless network nodes of the cell cluster is different from the LBT mode determined for terminal devices of the cell cluster; or
wherein the LBT mode determined for wireless network nodes of the cell cluster is the same as the LBT mode determined for terminal devices of the cell cluster.

20. The method according to claim 1, wherein the LBT mode is associated with one or more LBT configurations.

21. A method implemented in a terminal device operating in an unlicensed spectrum, comprising:
sending, to wireless network node, a capability bit indicating one or more Listen-before-Talk (LBT) modes that the terminal device supports;
receiving, from the wireless network node, configuration information indicating an LBT mode and a set of LBT configurations associated with the indicated LBT mode for the terminal device, the indicated LBT mode being determined by the wireless network node based on the capability bit; and
performing an LBT operation according to the indicated LBT mode and the set of LBT configurations,
wherein the set of LBT configurations relates to one or more of Physical Random Access Channel (PRACH) transmission, Physical Uplink Control Channel (PUCCH) transmission, Sounding Reference Signal (SRS) transmission and Physical Uplink Shared Channel (PUSCH) transmission.

22. A wireless network node operating in an unlicensed spectrum, comprising:
at least one processor; and
one or more memories storing instructions which when executed by the at least one processor, cause the wireless network node to:
receive, from a terminal device, a capability bit indicating one or more Listen-before-Talk (LBT) modes that the terminal device supports;
determine an n LBT mode for the terminal device based on the received capability bit;
determine a set of LBT configurations associated with the determined LBT mode; and
send configuration information indicating the determined LBT mode and the determined set of LBT configurations to the terminal device,
wherein the determined set of LBT configurations relates to one or more of Physical Random Access Channel (PRACH) transmission, Physical Uplink Control Channel (PUCCH) transmission, Sounding Reference Signal (SRS) transmission and Physical Uplink Shared Channel (PUSCH) transmission.

23. The method according to claim 1, wherein the determined set of LBT configurations includes at least one of the following categories:
category 1: immediate transmission after a short switching gap;
category 2: LBT without random back-off;
category 3: LBT with random back-off with a fixed size of a contention window; and
category 4: LBT with random back-off with a variable size of the contention window.

* * * * *